(12) United States Patent
Kalgaonkar et al.

(10) Patent No.: US 10,151,420 B2
(45) Date of Patent: Dec. 11, 2018

(54) SOLIDIFIED, THERMALLY INSULATING COMPOSITION

(71) Applicant: Halliburton Energy Services, Inc., Houston, TX (US)

(72) Inventors: Rajendra A. Kalgaonkar, Pune (IN); Vikrant B. Wagle, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 282 days.

(21) Appl. No.: 14/913,666

(22) PCT Filed: Sep. 23, 2013

(86) PCT No.: PCT/US2013/061250
§ 371 (c)(1),
(2) Date: Feb. 22, 2016

(87) PCT Pub. No.: WO2015/041703
PCT Pub. Date: Mar. 26, 2015

(65) Prior Publication Data
US 2016/0201433 A1   Jul. 14, 2016

(51) Int. Cl.
*E21B 36/00* (2006.01)
*F16L 59/02* (2006.01)
(Continued)

(52) U.S. Cl.
CPC ............ *F16L 59/028* (2013.01); *C04B 28/24* (2013.01); *C09K 8/03* (2013.01); *C09K 8/46* (2013.01);
(Continued)

(58) Field of Classification Search
CPC ...... E21B 36/003; E21B 33/138; E21B 33/10; E21B 33/13; E21B 33/14; E21B 43/103
See application file for complete search history.

(56) References Cited

U.S. PATENT DOCUMENTS 4,564,070 A   1/1986   Norton
5,320,171 A   6/1994   Laramay
(Continued)

FOREIGN PATENT DOCUMENTS

WO   2009034287 A1   3/2009

OTHER PUBLICATIONS

International Search Report and Written Opinion dated Jun. 26, 2014; International PCT Application No. PCT/US2013/061250.

*Primary Examiner* — Zakiya W Bates
(74) *Attorney, Agent, or Firm* — McGuireWoods LLP

(57) ABSTRACT

A thermally insulating composition comprises: (A) an aqueous liquid, wherein the aqueous liquid is the continuous phase of the composition; (B) a particulate, wherein the particulate is silica, and wherein the particulate is a dispersed phase of the composition; and (C) an activator, wherein the activator causes at least some of the particulate to aggregate and form a network of at least the particulate, wherein the formation of the network causes the insulating composition to become a gel, and wherein the gelled insulating composition inhibits or prevents heat loss from two areas having different temperatures. A method of thermally insulating a portion of an annulus comprises: introducing the insulating composition into a portion of an annulus, wherein the gelled insulating composition inhibits or prevents heat loss from the portion of the annulus to an area adjacent to the outside of a second object.

16 Claims, 2 Drawing Sheets

(51) Int. Cl.
*C04B 28/24* (2006.01)
*C09K 8/46* (2006.01)
*C09K 8/03* (2006.01)
*C04B 111/28* (2006.01)

(52) U.S. Cl.
CPC ......... *E21B 36/003* (2013.01); *C04B 2111/28* (2013.01); *C09K 2208/10* (2013.01)

(56) References Cited

U.S. PATENT DOCUMENTS

| | | | |
|---|---|---|---|
| 6,085,839 A * | 7/2000 | Wyant | C04B 28/26 166/292 |
| 7,013,973 B2 | 3/2006 | Danican et al. | |
| 7,458,424 B2 | 12/2008 | Odeh et al. | |
| 7,934,557 B2 | 5/2011 | Nguyen | |
| 7,954,549 B2 | 6/2011 | Lende et al. | |
| 9,045,965 B2 | 6/2015 | Patil et al. | |
| 9,133,386 B2 | 9/2015 | Kumar et al. | |
| 2004/0211566 A1 | 10/2004 | Slabaugh et al. | |
| 2006/0037754 A1 | 2/2006 | Funkjouser | |
| 2008/0146463 A1 | 6/2008 | Taylor et al. | |
| 2011/0094746 A1 | 4/2011 | Allison et al. | |
| 2011/0305830 A1 * | 12/2011 | Frantz | C04B 28/001 427/230 |

\* cited by examiner

SOLIDIFIED, THERMALLY INSULATING COMPOSITION

TECHNICAL FIELD

Thermally insulating compositions are used to protect against heat loss. The compositions can be used in the oil and gas industry, pipeline industry, and a variety of other industries.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
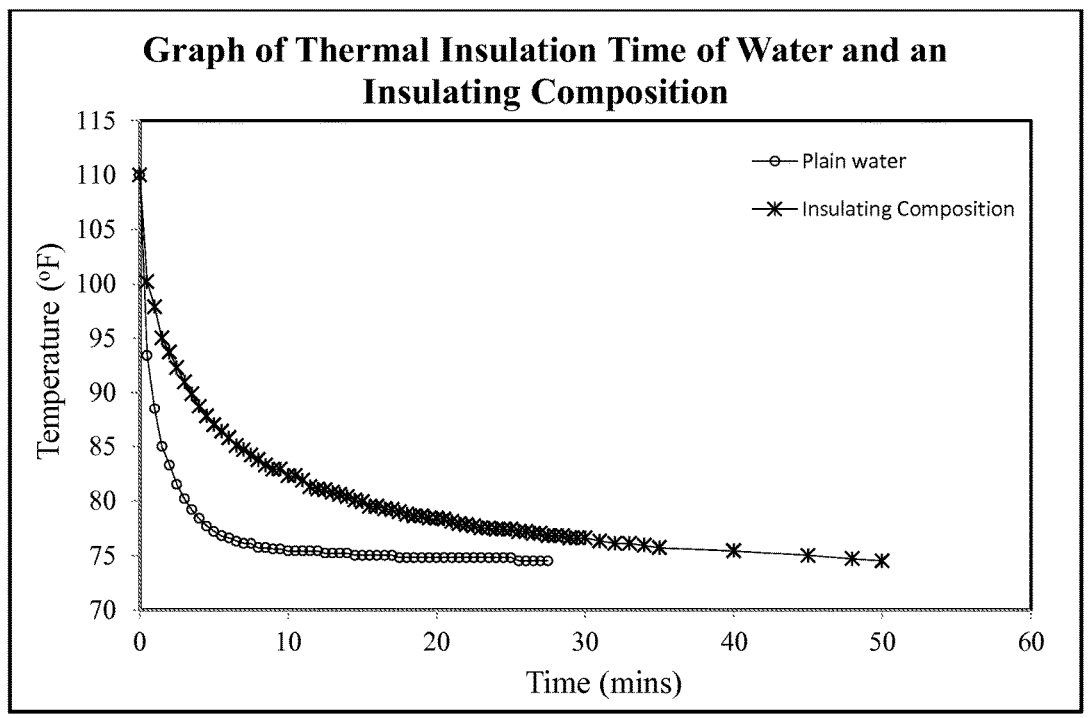
FIG. 1 is a graph of the thermal insulation time of deionized water compared to an insulating composition according to certain embodiments.

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas, a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase. A colloid will have only one continuous phase, but can have more than one dispersed phase. It is to be understood that any of the phases of a colloid (e.g., a continuous or dispersed phase) can contain dissolved or undissolved substances or compounds. As used herein, the phrase "aqueous-based" means a solution wherein an aqueous liquid is the solvent or a colloid wherein an aqueous liquid is the continuous phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wall of the wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

Some industries conduct operations in colder environments. For example, in off-shore drilling, the temperature of the water surrounding portions of a tubing string can be colder than the temperature of a subterranean formation. For on-land drilling, the temperature of the subterranean formation can be colder, for example in permafrost regions, compared to other drilling locations. In geology, a permafrost region is a region containing soil at or below the freezing point of water 0° C. (32° F.) for two or more years. Most permafrost is located in high latitudes (i.e., land close to the North and South poles), but alpine permafrost may also exist at high altitudes in much lower latitudes.

Production or transportation via pipelines of oil, gas, or water can be quite challenging in these colder environments. Heat flows from the higher temperature area to the colder temperature area. As such, heat from a warmer fluid within a wellbore or pipeline will tend to flow from the wellbore to the colder water or land surrounding the wellbore. Heat can flow via convection currents. Heat transfer by convection is the concerted, collective movement of molecules within fluids that allows heat to be transferred from one area to another. Several problems can arise, such as damage to wellbore components, due to this heat loss. For example, paraffin formation can occur due to the heat loss. Paraffin is a solid wax that can damage wellbore equipment such as pumps, seals, valves, etc. The loss of heat can also impair lubricants from protecting wellbore equipment; reduce the flow rate of reservoir fluid production; and possibly allow the casing to collapse. Moreover, other industries can experience difficulties with heat loss. By way of example, a pipeline located in a colder environment can experience clogging of the pipeline whereby fluid flow is diminished or stopped.

To combat losses of heat, a thermal insulator can be used. The thermal insulator can be in the form of a fluid that is introduced into desired locations. The insulator can function to inhibit or prevent heat loss from the warmer area to the colder area. For example, a thermally insulating fluid can be introduced into one or more wellbore intervals. The insulating fluid can inhibit or prevent heat loss from the wellbore to the subterranean formation. The wellbore intervals can be created by the use of at least two isolation devices, for example a pair of packers. The isolation devices can be used to seal the annulus located between the outside of a tubing string and the inside of another tubing string, the inside of the casing, or the inside of the wall of the wellbore. The wellbore interval is the annular space between the isolation devices.

It has been discovered that an aqueous-based, thermally insulating composition can be used to prevent or inhibit heat loss. The composition can be in a pumpable state prior to and during placement of the composition in desired locations. The composition can become a gel. The composition can also harden into a solid. Heat transfer by convection cannot take place in solids, since neither bulk current flows nor significant diffusion can take place in solids. This allows the solid insulating material to tolerate a wide range of temperatures for long periods of time while maintaining thermal insulating properties.

It is to be understood that if any laboratory test (e.g., thermal insulation or gel time) requires the test be performed at a specified temperature and possibly a specified pressure, then the temperature and pressure of the test composition is ramped up to the specified temperature and pressure after being mixed at ambient temperature and pressure. For example, the composition can be mixed at 71° F. (22° C.) and 1 atm (0.1 MPa) and then placed into the testing apparatus and the temperature of the composition can be ramped up to the specified temperature. As used herein, the rate of ramping up the temperature is in the range of about 3° F./min to about 5° F./min (about 1.67° C./min to about 2.78° C./min). After the composition is ramped up to the specified temperature and possibly specified pressure, the composition is maintained at that temperature and pressure for the duration of the testing.

If any laboratory test (e.g., thermal insulation or gel time) requires the composition to be mixed, then the composition is "mixed" according to the following procedure. The water is added to a mixing container and the container is then placed on a mixer base. The motor of the base is then turned on and maintained at 4,000 revolutions per minute (rpm). The dry and/or liquid ingredients are added to the container at a uniform rate in no more than a total of 15 seconds (s). After all the ingredients have been added to the water in the container, a cover is then placed on the container, and the composition is mixed at 12,000 rpm (+/−500 rpm) for 35 s (+/−1 s). It is to be understood that the composition is mixed at ambient temperature and pressure (about 71° F. (22° C.) and about 1 atm (0.1 MPa)).

As used herein, the "thermal insulation" test was performed as follows. Two glass vessels were filled with water. The temperature of the water was adjusted to 73.5° F. (23° C.). A steel beaker was then placed inside each glass vessel and a glass cylinder was placed inside each steel beaker. The glass vessels simulate a surrounding environment and the steel beakers could simulate a pipeline or casing of a wellbore. The space between the inside of the steel beaker and the outside of the glass cylinder represents an annulus. A test composition was then mixed. Water at a temperature of approximately 73.5° F. (23° C.) was then placed into the annular space between the outside of the glass cylinder and the inside of the steel beaker for one of the vessels and the test composition was placed into the annular space for the other vessel. 20 milliliters of water measuring 110° F. (43° C.) was then placed into the two glass cylinders. A thermometer was immediately placed into each of the glass cylinders to contact the heated water. Temperature measurements were continuously taken and the time for the water in each glass cylinder to cool down to 74.5° F. (23.5° C.) was recorded as the thermal insulation time.

A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. A flat gel indicates that the gelation of the substance is not gaining much strength with time; whereas, a progressive gel indicates that the gelation of the substance is rapidly gaining strength with time. A gel can be a fragile gel. A fragile gel is a fluid that acts like a gel when allowed to remain static for a period of time (i.e., no external force is applied to the fluid) thus exhibiting good suspending properties, but can be broken into a liquid or pumpable state by applying a force to the gel. Conversely, a progressive gel may not be breakable, or a much higher force may be required to break the gel. As used herein, the "gel time" is the time it takes for a fluid to exhibit gel characteristics, such as the fluid does not easily flow, without an external force applied to the fluid.

It is desirable for a substance, such as an activator, to be environmentally friendly. The OSPAR (Oslo/Paris convention for the Protection of the Marine Environment of the North-East Atlantic) Commission has developed a pre-screening scheme for evaluating chemicals used in off-shore drilling. According to OSPAR, a chemical used in off-shore drilling should be substituted with an environmentally-friendly chemical if any of the following are met: a. it is on the OSPAR LCPA (List of Chemicals for Priority Action); b. it is on the OSPAR LSPC (List of Substances of Possible Concern); c. it is on Annex XIV or XVII to REACH (Regulation (EC) No 1907/2006 of the European Parliament and of the Council of 18 Dec. 2006 concerning the Registration, Evaluation, Authorisation and Restriction of Chemicals); d. it is considered by the authority, to which the application has been made, to be of equivalent concern for the marine environment as the substances covered by the previous sub-paragraphs; e. it is inorganic and has a $LC_{50}$ or $EC_{50}$ less than 1 mg/l; f. it has an ultimate biodegradation (mineralization) of less than 20% in OECD 306, Marine BODIS or any other accepted marine protocols or less than 20% in 28 days in freshwater (OECD 301 and 310); g. half-life values derived from simulation tests submitted under REACH (EC 1907/2006) are greater than 60 and 180 days in marine water and sediment respectively (e.g. OECD 308, 309 conducted with marine water and sediment as appropriate); or h. it meets two of the following three criteria: (i) biodegradation: less than 60% in 28 days (OECD 306 or any other OSPAR-accepted marine protocol), or in the absence of valid results for such tests: less than 60% (OECD 301B, 301C, 301D, 301F, Freshwater BODIS); or less than 70% (OECD 301A, 301E); (ii) bioaccumulation: BCF>100 or log $P_{ow} \geq 3$ and molecular weight <700, or if the conclusion of a weight of evidence judgement under Appendix 3 of OSPAR Agreement 2008-5 is negative; or (iii) toxicity: $LC_{50}$<10 mg/l or $EC_{50}$<10 mg/l; if toxicity values <10 mg/l are derived from limit tests to fish, actual fish $LC_{50}$ data should be submitted. As used herein, a polymer is considered to be "environmentally friendly" if any of the above conditions are not satisfied.

As used herein, a substance is considered "biodegradable" if the substance passes the OECD TG 306: Closed Bottle Seawater test. In accordance with Organisation for Economic Co-operation and Development (OECD) guidelines, a substance showing more than 20% biodegradability in 28 days according to the 306 test can be classified as primary biodegradable. A substance showing more than 60% biodegradability in 28 days (or if the polymer is just below the 60% mark, then the test period can be extended by a few days) according to the 306 test can be classified as ultimate biodegradable, and it may be assumed that the substance will undergo rapid and ultimate degradation in a marine environment. A substance can be classified as primary or ultimate biodegradable if it passes the 306 test. Seawater generally contains the following major elements (by percentage): 85.84% oxygen; 10.82% hydrogen; 1.94% chlorine; 1.08% sodium; 0.13% magnesium; 0.09% sulfur; 0.04% calcium; 0.04% potassium; 0.007% bromine; and 0.003% carbon. The 306 test is performed as follows. A solution of the substance dissolved in seawater, usually at 2-5 milligrams per liter (mg/L), is inoculated with a relatively small number of microorganisms from a mixed population and kept in completely full, closed bottles in the dark at a constant temperature. Degradation is followed by analysis of dissolved oxygen over a 28 day period. The amount of oxygen taken up by the microbial population during biodegradation of the test substance, corrected for uptake by the blank inoculum run in parallel, is expressed as a percentage of ThOD or, less satisfactorily COD.

According to an embodiment, a thermally insulating composition comprises: (A) an aqueous liquid, wherein the aqueous liquid is the continuous phase of the composition; (B) a particulate, wherein the particulate is silica, and wherein the particulate is a dispersed phase of the composition; and (C) an activator, wherein the activator causes at least some of the particulate to aggregate and form a network of at least the particulate, wherein the formation of the network causes the insulating composition to become a gel, and wherein the gelled insulating composition inhibits or prevents heat loss from two areas having different temperatures.

According to another embodiment, a method of thermally insulating a portion of an annulus comprises: introducing the insulating composition into the portion of the annulus, wherein the annulus is the space between the outside of a first object and the inside of a second object, wherein the portion of the annulus has a temperature greater than the temperature of an area adjacent to the outside of the second object, wherein the insulating composition is in a pumpable state prior to and during introduction into the annulus, and wherein the gelled insulating composition inhibits or prevents heat loss from the portion of the annulus to the area adjacent to the outside of the second object.

The discussion of preferred embodiments regarding the insulating composition or any ingredient in the insulating composition, is intended to apply to all of the composition embodiments and method embodiments. Any reference to the unit "gallons" means U.S. gallons.

The insulating composition includes an aqueous liquid. The aqueous liquid can be selected from the group consisting of freshwater, brackish water, saltwater, and any combination thereof. The aqueous liquid is the continuous phase of the composition. According to an embodiment, the insulating composition is a slurry in which the aqueous liquid is the continuous phase of the slurry. The continuous phase of the composition can include dissolved or undissolved substances or compounds. By way of example, the continuous phase can include a water-soluble salt that dissolves in the aqueous liquid.

The insulating composition includes a particulate. The particulate is a dispersed phase of the composition. The particulate can be water-insoluble. A substance is considered to be "insoluble" in a liquid if less than 10 grams of the substance can be dissolved in one liter of the liquid when tested at 77° F. (25° C.) and a pressure of 1 atmosphere (0.1 MPa). The particulate is silica. Silicon dioxide, also known as silica, is a chemical compound that is an oxide of silicon with the chemical formula $SiO_2$. Silica is most commonly found in nature as sand or quartz, as well as in the cell walls of diatoms. Silica can be manufactured in several forms including fused quartz, crystal, fumed silica, colloidal silica, silica gel, and aerogel. Due to the natural origin of silica, the particulate can be environmentally benign. That is, the particulate would not cause harm to the environment or aquatic life.

At least 90% of the particulate can be mesoscopic particles or nanoparticles. As used herein, a "mesoscopic particle" is a particle having a particle size in the range of 1 micron to 0.1 micron. As used herein, a "nanoparticle" is a particle having a particle size of less than 0.1 micron. As used herein, the term "particle size" refers to the volume surface mean diameter ("$D_s$"), which is related to the specific surface area of the particle. The volume surface mean diameter may be defined by the following equation: $D_s=6/(\Phi_s A_w \rho_p)$, where $\Phi_s$=sphericity; $A_w$=specific surface area; and $\rho_p$=particle density. According to an embodiment, the insulating composition is a stable slurry at least prior to introduction into an annulus. The insulating composition can also be a stable slurry during introduction into the annulus. Under this context, a slurry is considered stable if at least 80% of the undissolved solids do not settle out of the liquid continuous phase. According to another embodiment, the particle size of the particulate is selected such that the insulating composition is a stable slurry at least prior to introduction into the annulus.

The insulating composition can further include a suspending agent. The suspending agent can help suspend the particulate in the aqueous liquid. The concentration of the suspending agent can vary and can be selected, in part, based on the particle size of the particulate. The suspending agent can be a polymer. The suspending agent can comprise, without limitation, xanthan, guar, carboxymethyl cellulose, or polyacrylamide.

The insulating composition also includes the activator. The activator can be biodegradable and/or environmentally friendly. The activator causes at least some of the particulate to aggregate and form a network of at least the particulate. The activator can be any substance that facilitates or causes inter-particle collisions of the particulate such that the particulate aggregates and forms a network. The network can further include at least some of the activator. The network can be formed from all of the particulate. The network can also be formed from all of the particulate and all of the activator. The network can include long, chain-like strings of at least the particulate. The network can also be three-dimensional. The formation of the network causes the insulating composition to become a gel.

It is believed that silica slurries are stable and non-gelled prior to the addition of the activator due to the electrical repulsion between the silica particles having the same charge. The inter-particle repulsion allows the silica particles to remain dispersed throughout the aqueous liquid and not settle out of the liquid. According to an embodiment, the activator causes the particulate to aggregate via a disturbance in at least some of the charges of the silica particles. For example, a disturbance in some of the charges can increase inter-particle collisions, cause the particulate to aggregate, and siloxane bonds (Si—O—Si) can be formed. This allows a network of at least the particulate to begin forming.

According to an embodiment, the activator is an acid or an acid derivative. The activator can decrease the pH of the insulating composition after addition of the activator. According to an embodiment, the insulating composition has a pH of at least 9 prior to the addition of the activator to the insulating composition. The insulating composition can further comprise a pH buffer or base for increasing the pH of the insulating composition to at least 9, prior to the addition of the activator. Silica slurries are generally stable at a pH above approximately 9. The stability and dispersability can be due to repulsion between the silica particles in a liquid having a pH above 9. Therefore, at a pH above approximately 9, the insulating composition slurry should be stable. According to an embodiment, the activator decreases the pH of the insulating composition. The activator can decrease the pH of the insulating composition below a pH of approximately 9. The activator can also decrease the pH of the insulating composition to a pH in the range of about 1 to less than 9. According to an embodiment, the decrease in pH of the insulating composition causes the formation of the network and gelation of the insulating composition.

The network can be a coordination or chelate complex. The particulate can be a chelating agent (also called a ligand). A chelate complex exists when a single metal ion forms coordinate bonds with a polydentate ligand. A ligand is commonly called a chelant, chelating agent or sequestering agent. A coordination complex exists when a single metal ion forms coordinate bonds with a monodentate ligand. The ligand sequesters and inactivates the central metal ion so the metal ion does not easily react with other elements or ions to produce precipitates or scale. A polydentate ligand is a molecule or compound in which at least two atoms of the ligand bond with the metal ion. A polydentate ligand can be, for example, bidentate (2 atoms bond), tridentate (3 atoms bond), tetradentate (4 atoms bond), pentadentate (5 atoms bond), and so on. A monodentate ligand is a molecule or compound in which only one atom of the ligand bonds with the metal ion. The ligand can also contain at least one functional group that is capable of forming a bond with the metal ion. Common functional groups include a carboxylate, an amine, an alcohol, and an ether.

One or more chelate or coordination complexes can be cross-linked with each other via the chelating agent or a cross-linking agent. As used herein, a "cross-link" is a connection between two or more chelate or coordination complexes. Accordingly, the metal ion should contain at least 2 available charges for cross-linking with another atom of a different chelate or coordination complex.

The activator can include a metal, metal oxide, or metal hydroxide. According to an embodiment, the metal, metal oxide, or metal hydroxide of the activator is capable of forming a chelate complex or coordination complex with the particulate. The metal, metal oxide, or metal hydroxide can be any metal that forms or is capable of forming the chelate complex or coordination complex in the presence of the particulate ligand. According to an embodiment, the metal, metal oxide, or metal hydroxide has at least one available charge for creating a bond with an available charge of the particulate. According to another embodiment, the metal, metal oxide, or metal hydroxide has two or more available charges for creating bonds with two or more available charges of the particulate. The metal, metal oxide, or metal hydroxide can also contain an additional available charge for cross-linking with another chelate complex or coordination complex. The formation of the coordination or chelate complex can cause the formation of the network and gelation of the insulating composition.

Examples of suitable metals include, but are not limited to, the metals found in Groups IA, IIA, and IIB of the periodic table as well as tin (Group IVB), the oxides or hydroxides of the aforementioned metals. The metal oxide can also be a metal that reacts in the presence of water to form a metal hydroxide. Preferably, the metal is sodium or potassium. The activator can also contain more than one metal, metal oxide, or metal hydroxide, wherein the two or more metals, metal oxides, or metal hydroxides are the same or different. By way of example, a first metal hydroxide can be sodium hydroxide while a second metal oxide can be potassium oxide. Without being limited by theory, it is believed that a metal hydroxide functions as a catalyst for causing the particulate to aggregate and form the network.

According to yet another embodiment, the activator is an ionic-strength modifier. The total ionic strength of the insulating composition will also affect the aggregation of the particulate and network formation. At an ionic strength of greater than about 10, the silica particles should repel one another and provide a stable slurry. The activator can reduce the ionic strength of the insulating composition to cause at least some of the particulate to aggregate and form the network. According to an embodiment, the activator reduces the total ionic strength of the insulating composition to less than about 10, preferably less than 3.5, and more preferably less than 0.75 (sea water has an ionic strength of about 0.72). Inorganic ions such as potassium, sodium, magnesium, calcium, chloride, sulfate, bisulfate, carbonate, or bicarbonate may be present naturally in the aqueous liquid used to prepare the composition, or they may be added intentionally in order to adjust the ionic strength of the insulating composition.

The activator can be selected from the group consisting of organophosphonates, aminocarboxylic acids, hydroxypolycarboxylates, phenolic acids, polyphenolic acids, ascorbic acid, an alkali metal salt or ammonium salt of any of the foregoing, and combinations thereof. The activator can be selected from the group consisting of phytic acid, methylglycinediacetic acid, polyepoxysuccinic acid, an alkali metal salt or ammonium salt of any of the foregoing, and combinations thereof.

Phytic acid is an organophosphonate that is naturally found in hulls of nuts, seeds and grains. The chemical structure of phytic acid is:

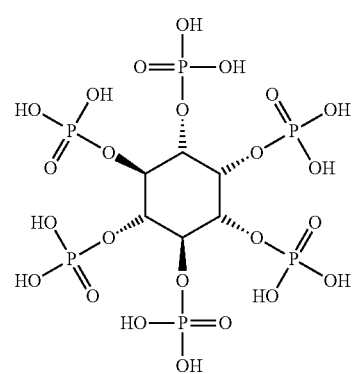

The structure of methylglycinediacetic acid (sometimes referred to as "MGDA" or a-alaninediacetic acid) is shown below. The activator can also be the trisodium salt of MGDA (MGDA-Na$^3$).

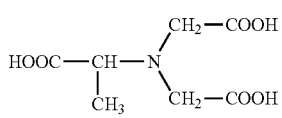

The structure of polyepoxysuccinic acids and their derivatives is shown below:

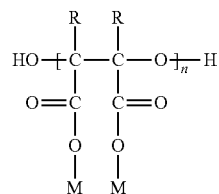

Notes: n = 2-10
M: $Na^+$ or $H^+$, $K^+$, $NH_4^+$
R: H or $C_{1-4}$ alkyl

The insulating composition is preferably in a pumpable state prior to and during introduction into the annulus. According to an embodiment, the pH of the insulating composition should be selected and maintained such that the insulating composition is in the pumpable state. According to another embodiment, the ionic strength of the insulating composition should be selected and maintained such that the insulating composition is in the pumpable state. It is to be understood that even if the insulating composition begins to form a gel during introduction into the annulus, the insulating composition may still be pumpable due to shear being imparted on the insulating composition. For example, the gel that is formed may be a fragile gel that breaks under shear. As such, the pH or ionic strength of the composition may begin to slowly decrease such that the insulating composition remains pumpable until after the insulating composition is situated in the portion of the annulus to be thermally insulated. According to an embodiment, the insulating composition does not become a gel until a desired amount of time. The desired amount of time can be the time it takes to introduce the insulating composition into the annulus. The desired amount of time can also be shortly before the insulating composition has reached the desired portion of the annulus. The desired amount of time can also be in the range from a few minutes to several hours at a specific temperature. The desired amount of time for gelation can be in the range from about 30 minutes to about 10 hours.

There are several factors that can affect the amount of gelation and the gel time of the insulating composition, including but not limited to: the concentration of the particulate; the particle size of the particulate; the type of activator; the concentration of the activator; and the temperature of the aqueous liquid or the annulus. Generally, as the concentration of the particulate increases and the particle size decreases, the insulating composition will have a lower gel time and have a higher amount of gelation. Moreover, depending on the concentration of the particulate, the concentration of the activator can be increased such that more of the particulate forms the network and the composition has a shorter gel time. Conversely, the concentration of the activator can be slowly increased to provide a longer gel time. Generally, as the temperature increases, the gel time will decrease.

According to an embodiment, the concentration of the particulate and the particle size of the particulate are selected such that the insulating composition has the desired gel time. The concentration of the particulate can be in the range of about 2% to about 40% weight by weight of the aqueous liquid.

According to another embodiment, the concentration of the activator is selected such that the insulating composition has the desired gel time. The activator can be in a concentration in the range of about 1% to about 15% volume by volume of the insulating composition. The activator can also be in a concentration in the range of about 2% to about 10% volume by volume of the insulating composition. The activator can be in a concentration in the range of about 0.25% to about 8% weight by volume of the insulating composition. The activator can also be in a concentration in the range of about 0.5% to about 2% weight by volume of the insulating composition.

According to yet another embodiment, the temperature of the insulating composition is selected such that the insulating composition has the desired gel time. The temperature of the portion of the annulus can also be adjusted to provide the desired gel time. The temperature of the insulating composition can be in the range of about 50° F. to about 300° F. (about 10° C. to about 149° C.). The portion of the annulus can have a temperature in the range of about 14° F. to about 300° F. (about −10° C. to about 149° C.). The portion of the annulus can be heated or cooled to provide an optimum temperature such that the insulating composition has the desired gel time.

The methods include introducing the insulating composition into the annulus. The annulus is the space between the outside of a first object and the inside of a second object. Necessarily, the first object must be located inside the second object. The first and second objects can comprise a pipe. The first and second objects can be pipelines or tubing strings. The second object can also be the wall of a wellbore, the wall of an underground pipeline, or a casing. The area adjacent to the outside of the second object can be without limitation part of a subterranean formation, a body of seawater, or another annulus. The subterranean formation can be in a permafrost region. The body of seawater can be without limitation a lake, river, pond, sea, ocean, or gulf. The annulus can be between a pair of packers or other suitable isolation devices. The insulating composition can also be introduced into more than one portion of an annulus. For example, the composition could be introduced into a first wellbore interval located between a first pair of packers and introduced into a second wellbore interval located between a second pair of packers. The insulating composition can be a packer fluid.

The portion of the annulus has a temperature greater than the temperature of an area adjacent to the outside of the second object. As used herein, the word "adjacent" means in close proximity, either touching or not necessarily touching. According to an embodiment, the temperature of the area adjacent to the outside of the second object is such that without thermal insulation, problems to operations or damage to equipment could occur. According to an embodiment, the annulus is part of a wellbore, wherein the wellbore penetrates a subterranean formation. The subterranean formation can be located on land or off shore. The wellbore is part of a well. The well can be without limitation an oil, gas, or water production well, or an injection well.

The insulating composition can become a solid. Preferably, the insulating composition becomes a solid after the composition becomes a gel. The insulating composition can become a solid at a time in the range of about 1 hour to about 15 hours. According to an embodiment, the insulating composition inhibits or prevents heat loss from the portion of the annulus to the area adjacent to the outside of the second object or other colder areas. A solid insulating composition can substantially inhibit or prevent convection currents from transferring heat from the annulus to the area adjacent to the outside of the second object. It is also believed that the gelled insulating composition can also inhibit convection currents prior to solidifying. The inhibition or prevention of the heat loss is preferably for the time thermal insulation is needed. For example, the insulating composition can provide the thermal insulation for the time necessary to complete the oil or gas operation or by way of another example to transmit a fluid through a pipeline. Of course, other industries, such as mining, etc., not specifically mentioned can utilize the embodiments disclosed and the time for thermal insulation can vary among the industries. Preferably, once the insulating composition solidifies, it is not susceptible to wearing away or movement within the annulus. For example, the solid insulating composition can be impermeable to fluids. As a result, the insulating composition can be impervious to degradation fluids or chemical decomposition fluids. Therefore, the solid insulating composition should provide thermal insulation to the first object (e.g., a tubing string or pipeline) and any fluids located within the first object (e.g., liquid hydrocarbons).

The insulating composition can gain gel strength during the gelation process. The insulating composition can also continue to gain gel strength over several hours to several days after gelation. The insulating composition can also gain compressive strength during the solidification process. The insulating composition can also continue to gain compressive strength over several days to several weeks after solidification.

The insulating composition can further include other additives. Examples of other additives include, but are not limited to, a weighting agent, a fluid loss additive, a set retarder, a set accelerator, a friction reducer, a light-weight additive, a defoaming agent, a high-density additive, elastomers, a mechanical property enhancing additive, a lost-circulation material, a filtration-control additive, a gas migration control additive, a thixotropic additive, a viscosifying additive, and combinations thereof.

The method embodiments can further comprise forming the insulating composition or an insulating mixture prior to introduction of the composition. According to this embodiment, the step of forming can comprise: adding at least the aqueous liquid and the particulate to a mixing apparatus; and mixing the liquid and particulate to form the insulating mixture. The step of forming can further include adding the activator to the mixing apparatus to form the insulating composition. The step of mixing can be performed using a suitable mixing apparatus. The activator can also be introduced in a pill-type fashion after at least some of the insulating mixture has been introduced into the annulus. The activator can then partially or fully mix with the insulating mixture to form the insulating composition. The methods can further include producing a reservoir fluid after the step of introducing the insulating composition.

According to an embodiment, the activator is an acid, the insulating composition has a pH of at least 9 prior to the addition of the activator to the insulating composition, the activator decreases the pH of the insulating composition to a pH in the range of about 1 to less than 9, and the decrease in pH of the insulating composition causes the formation of the network and gelation of the insulating composition.

According to another embodiment, the network is a coordination or chelate complex, wherein the particulate is a chelating agent, wherein the activator comprises a metal, metal oxide, or metal hydroxide, and wherein the metal, metal oxide, or metal hydroxide forms the coordination or chelate complex with the particulate, and wherein the formation of the coordination or chelate complex causes the formation of the network and gelation of the insulating composition.

According to another embodiment, the activator is an ionic-strength modifier, wherein the activator reduces the ionic strength of the insulating composition to cause at least some of the particulate to aggregate and form the network, and wherein the activator reduces the total ionic strength of the insulating composition to less than about 10.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Unless stated otherwise, all of the insulating compositions were mixed and tested according to the procedure for the specific test as described in The Detailed Description section above.

Tables 1-3 provide the type of activator, activator concentration (expressed in units of milliliters "mL" or grams "g"), temperature, and gel time (expressed in units of hours "hrs" or minutes "mins") for several different insulating compositions. Each composition for Tables 1-4 contained water as the continuous phase, 12 nanometer (nm) particle size silica particulate at a concentration of 40% weight by weight of the water, and an activator in varying concentrations.

TABLE 1

| Type of Activator | Activator Conc. in 200 mL solution | Temperature (° F.) | Gel Time |
|---|---|---|---|
| phytic Acid | 15 mL | 200 | 6 hrs |
| phytic Acid | 5 mL | 300 | 50 mins |

TABLE 2

| Type of Activator | Activator Conc. in 200 mL solution | Temperature (° F.) | Gel Time |
|---|---|---|---|
| methylglycinediacetic acid | 1 g | 200 | 4 hrs |
| methylglycinediacetic acid | 1 g | 300 | 50 mins |

TABLE 3

| Type of Activator | Activator Conc. in 200 mL solution | Temperature (° F.) | Gel Time |
|---|---|---|---|
| polyepoxysuccinic acid | 15 mL | 200 | 2 hrs |
| polyepoxysuccinic acid | 5 mL | 200 | 6 hrs |
| polyepoxysuccinic acid | 5 mL | 300 | 50 mins |

As can be seen in Tables 1-3, each of the activators caused the silica particulate to aggregate, form a network, and the composition became a gel. As can also be seen, the temperature of the liquid had a significant effect on the gel time of the composition. For example, as can be seen in Table 3, for the same concentration of activator, an increase in 100° F. (38° C.) caused the composition to gel in only 50 minutes compared to 6 hours. Moreover, by increasing the concentration of the activator, the gel time can be decreased at the same temperature.

Table 4 shows the effect of pH on the gel time of an insulating composition. The insulating composition contained polyepoxysuccinic acid activator at a concentration of 1 g per 200 mL of the solution. The composition was tested at a temperature of 200° F. (93° C.). As can be seen in Table 4, the composition took 8 hours to gel at a pH of 10, theoretically due to the repulsion between the same charged silica particles. However, as the pH of the composition decreases, a greater number of inter-particle aggregates form, thus leading to the formation of a network and gelled composition. Therefore, the pH of the composition can be adjusted to provide a desired gel time.

TABLE 4

| pH | Gel Time |
| --- | --- |
| 10 | 8 hrs |
| 7 | 1 hr |
| 5 | 30 mins |

FIG. 1 is a graph of the thermal insulation time for deionized water and an insulating composition as tested in Table 3, wherein the polyepoxysuccinic acid activator was in a concentration of 5 mL per 200 mL of the solution. As can be seen in FIG. 1, the water had a thermal insulation time of only 14 mins; whereas, the insulating composition had a thermal insulation time of 45 mins. This shows that the insulating composition provides less heat loss from the heated water to the cooled water.

Figure 2A:
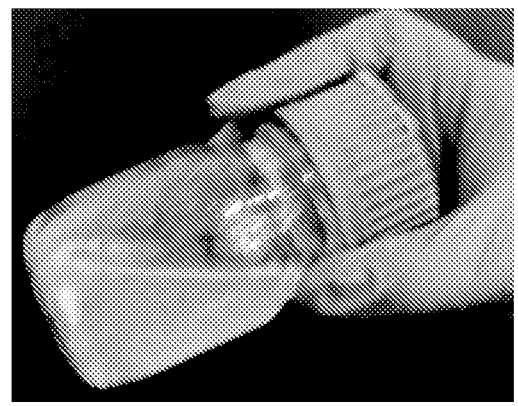
FIGS. 2A-2C are photographs showing a non-gelled, gelled, and solidified insulating composition at various times and temperatures.
Figure 2B:
Figure 2C:

FIGS. 2A-2C are photographs showing gelation and solidification of the insulating compositions as tested in Table 3, wherein the polyepoxysuccinic acid activator was in a concentration of 5 mL per 200 mL of the solution. The other compositions tested in Tables 1 and 2 provided very similar results as those depicted in the photographs of FIGS. 2A-2C. In FIGS. 2A and 2B, the composition was heated to 200° F. (93° C.). The photograph in FIG. 2A was taken at a time of 2 hours and shows that the composition is still in a flowable, liquid, pumpable state. However, in FIG. 2B, the composition is in a very gelled state with some crystalline areas as depicted in the photograph taken at a time of 6 hours. In FIG. 2C, the composition was heated to 300° F. (149° C.) and the photograph was taken at 50 minutes. As can be seen in FIG. 2C, the insulating composition is in a completely solid state after only 50 minutes.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of thermally insulating a portion of an annulus comprising:
   introducing an insulating composition into the portion of the annulus,
      wherein the annulus is the annulus of a wellbore penetrating a permafrost region;
      wherein the annulus is the space between the outside of a first object and the inside of a second object,
      wherein the portion of the annulus has a temperature greater than the temperature of an area adjacent to the outside of the second object, and
      wherein the insulating composition comprises:
         (A) an aqueous liquid, wherein the aqueous liquid is the continuous phase of the composition;

(B) a particulate, wherein the particulate is silica, and wherein the particulate is a dispersed phase of the composition; and (C) an activator, wherein the activator is phytic acid, wherein the activator causes at least some of the particulate to aggregate and form a network of at least the particulate, and wherein the formation of the network causes the insulating composition to become a gel, wherein the insulating composition is in a pumpable state prior to and during introduction into the annulus, and wherein the gelled insulating composition inhibits or prevents heat loss from the portion of the annulus to the area adjacent to the outside of the second object.

2. The method according to claim 1, wherein the aqueous liquid is selected from the group consisting of freshwater, brackish water, saltwater, and any combination thereof.

3. The method according to claim 1, wherein at least 90% of the particulate are nanoparticles.

4. The method according to claim 1, wherein the particle size of the particulate is selected such that the insulating composition is a stable slurry at least prior to introduction into the annulus.

5. The method according to claim 1, wherein the network further comprises at least some of the activator.

6. The method according to claim 1, wherein the insulating composition has a pH of at least 9 prior to the addition of the activator to the insulating composition.

7. The method according to claim 6, wherein the activator decreases the pH of the insulating composition to a pH in the range of about 1 to less than 9.

8. The method according to claim 7, wherein the decrease in pH of the insulating composition causes the formation of the network and gelation of the insulating composition.

9. The method according to claim 1, wherein the network is a coordination or chelate complex, and wherein the particulate is a chelating agent.

10. The method according to claim 1, wherein the formation of the coordination or chelate complex causes the formation of the network and gelation of the insulating composition.

11. The method according to claim 1, wherein the insulating composition comprises an ionic strength; wherein the activator reduces the ionic strength of the insulating composition to cause at least some of the particulate to aggregate and form the network.

12. The method according to claim 11, wherein the activator reduces the total ionic strength of the insulating composition to less than about 10.

13. The method according to claim 1, wherein the activator is in a concentration in the range of about 1% to about 15% volume by volume of the insulating composition or about 0.25% to about 8% weight by volume of the insulating composition.

14. The method according to claim 1, wherein the insulating composition becomes a solid, wherein the insulating composition becomes a solid after the composition becomes a gel.

15. A thermally insulating composition comprising:

(A) an aqueous liquid, wherein the aqueous liquid is the continuous phase of the composition;

(B) a particulate, wherein the particulate is silica, and wherein the particulate is a dispersed phase of the composition; and (C) an activator, wherein the activator is phytic acid, wherein the activator causes at least some of the particulate to aggregate and form a network of at least the particulate, wherein the formation of the network causes the insulating composition to become a gel, and wherein the gelled insulating composition inhibits or prevents heat loss from two areas having different temperatures.

16. A system for thermally insulating an object comprising:

(A) the object; wherein the object is disposed in a wellbore penetrating a permafrost region; and (B) a thermally insulating composition, wherein the thermally insulating composition is located adjacent to the object, and wherein the thermally insulating composition comprises:

(i) an aqueous liquid, wherein the aqueous liquid is the continuous phase of the composition;

(ii) a particulate, wherein the particulate is silica, and wherein the particulate is a dispersed phase of the composition; and (iii) an activator, wherein the activator is phytic acid, wherein the activator causes at least some of the particulate to aggregate and form a network of at least the particulate, wherein the formation of the network causes the insulating composition to become a gel, and wherein the gelled insulating composition inhibits or prevents heat loss from a higher temperature area located adjacent to the object to a lower temperature area located adjacent to the object.

* * * * *